(12) United States Patent
Chatterjee et al.

(10) Patent No.: US 8,154,515 B2
(45) Date of Patent: Apr. 10, 2012

(54) MOUSE DONGLE STORAGE

(75) Inventors: Monique Chatterjee, Seattle, WA (US); Eric Wahl, Kirkland, WA (US); Ge Weiguo, Chengdu (CN); William R. Wylde, Shenzhen (CN); KeLong Zhao, GuangDong (CN)

(73) Assignee: Microsoft Corporation, Redmond, WA (US)

( * ) Notice: Subject to any disclaimer, the term of this patent is extended or adjusted under 35 U.S.C. 154(b) by 1008 days.

(21) Appl. No.: 11/876,929

(22) Filed: Oct. 23, 2007

(65) Prior Publication Data
US 2009/0102790 A1 Apr. 23, 2009

(51) Int. Cl.
G06F 3/033 (2006.01)
G09G 5/08 (2006.01)

(52) U.S. Cl. ........................................... 345/163

(58) Field of Classification Search ............ 235/462.43, 235/462.45, 462.46, 462.47; 463/36–38; 273/148 B; 74/471 XY; D14/417, 454, 426; 345/163–167; 341/20
See application file for complete search history.

(56) References Cited

U.S. PATENT DOCUMENTS

| 5,828,364 | A | * | 10/1998 | Siddiqui | ........................ | 345/163 |
| 5,854,621 | A | * | 12/1998 | Junod et al. | .................... | 345/158 |
| 6,166,722 | A | | 12/2000 | Kawabe et al. | | |
| 6,978,163 | B2 | | 12/2005 | Dyer et al. | | |
| 7,233,319 | B2 | | 6/2007 | Johnson et al. | | |
| 2005/0012719 | A1 | * | 1/2005 | Su | ................. | 345/163 |
| 2005/0219208 | A1 | | 10/2005 | Eichenberger et al. | | |
| 2006/0038779 | A1 | * | 2/2006 | Li | ................. | 345/163 |
| 2007/0113098 | A1 | * | 5/2007 | Croley | .......................... | 713/186 |
| 2007/0132733 | A1 | | 6/2007 | Ram | | |
| 2008/0111792 | A1 | * | 5/2008 | Roberts et al. | ................ | 345/163 |

OTHER PUBLICATIONS

Consumer Guide Products: Expert review—Microsoft Wireless Optical Notebook Mouse 4000; May 10, 2006; http://products.howstuffworks.com/microsoft-wireless-optical-notebook-mouse-4000-review.htm.*
"Microsoft Wireless Notebook Optical Mouse (Winter Blue)", pp. 1-4.
"Rocketfish Twister Wireless Laser Notebook Mouse", pp. 1-7.
"Logitech V200 Cordless Notebook Mouse in Silver", pp. 1-2.
Smith, "Logitech Plugs in 'World's Smallest' Cordless Mouse Dongle" Jul. 23, 2007, pp. 1-3.
King, "Logitech MX Revolution Review" Feb. 9, 2007, Digital Trends, 2007, pp. 1-4.

* cited by examiner

*Primary Examiner* — Alexander Eisen
*Assistant Examiner* — Patrick F Marinelli
(74) *Attorney, Agent, or Firm* — Alleman Hall McCoy Russell & Tuttle LLP

(57) ABSTRACT

A computer mouse for use with a computing device, and a user input device assembly including a computer mouse and a communications dongle, are provided. The computer mouse may include a body having an outer casing, the outer casing having a battery compartment formed therein, and a battery door releasably secured to the outer casing in an orientation that covers the battery compartment. The battery door may include a mounting structure configured to releasably secure a communications dongle.

15 Claims, 2 Drawing Sheets

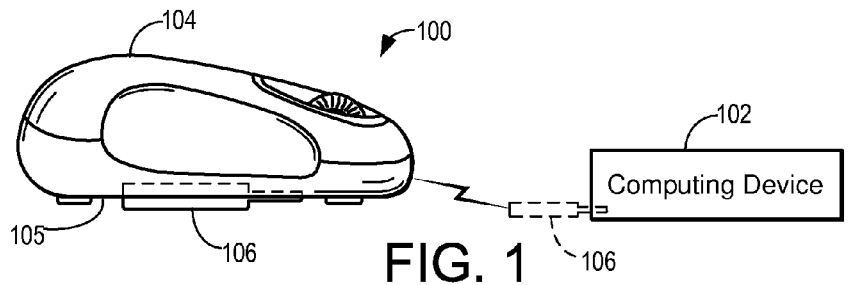
FIG. 1
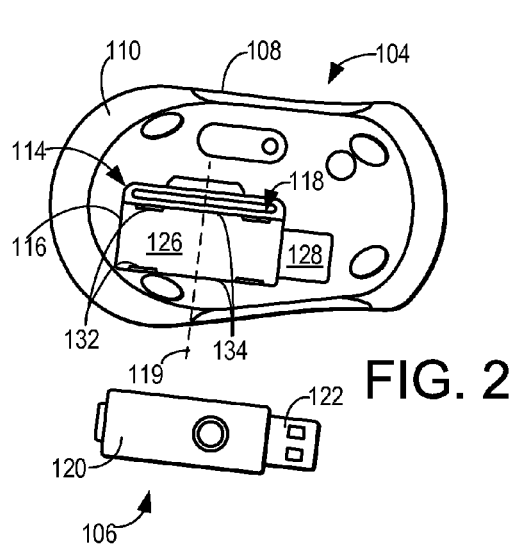
FIG. 2
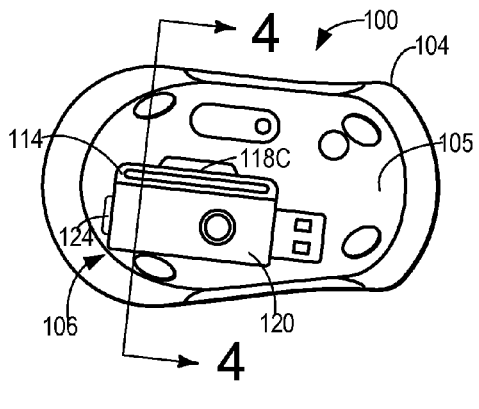
FIG. 3
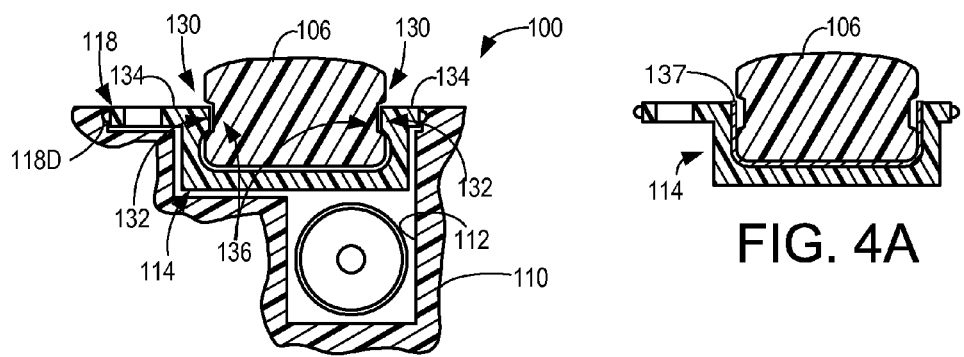
FIG. 4
FIG. 4A

MOUSE DONGLE STORAGE

BACKGROUND

A computer mouse may utilize a dongle that enables wireless communication between the computer mouse and a computing device. Some prior computing mice have been provided with a dongle storage mechanism on a bottom of the mouse that allows a dongle to be attached to and stored with the computer mouse when not in use. However, such a dongle storage mechanism occupies valuable space on the bottom of the mouse, and restrains the ability to add other features to the bottom of the mouse, such as a battery door for access to a battery compartment. In these prior designs, access to the battery compartment has been provided in a different location such as on a top surface of the mouse. This can increase design complexity and manufacturing cost.

SUMMARY

A computer mouse for use with a computing device, and a user input device assembly including a computer mouse and a communications dongle, are provided. The computer mouse may include a body having an outer casing, the outer casing having a battery compartment formed therein, and a battery door releasably secured to the outer casing in an orientation that covers the battery compartment. The battery door may include a mounting structure configured to releasably secure a communications dongle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a side view of a user input device assembly including a computer mouse for providing user input to a computing device and a communications dongle releasably secured to the computer mouse.

FIG. 2 is a bottom view of the user input device assembly of FIG. 1, showing the communications dongle detached from the computer mouse.

FIG. 3 is a bottom view of the user input device assembly of FIG. 1, showing the communications dongle attached to the computer mouse.

FIG. 4 is a cross section of the user input device assembly of FIG. 1, showing the communications dongle releasably secured to the computer mouse by a prong and groove connection.

FIG. 4A is a cross section of the battery door of the user input device assembly of FIG. 1, showing the communications dongle releasably secured to the computer mouse by a friction fit.

DETAILED DESCRIPTION

Figure 5:
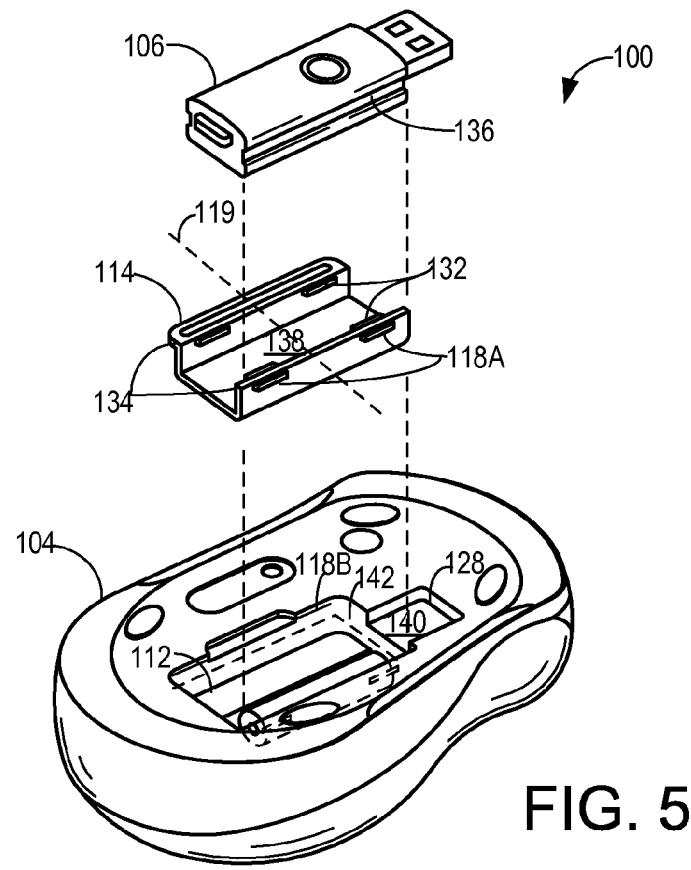
FIG. 5 is an exploded bottom perspective view of the user input device assembly of FIG. 1.

FIG. 1 illustrates a side view of user input device assembly 100 for use with a computing device 102. The user input device assembly 100 may include a computer mouse 104 and a communications dongle 106 releasably secured to the computer mouse 104. The communications dongle 106 may be configured to provide wireless communication between the computer mouse 104 and the computing device 102. It will be appreciated that the computer mouse 104 may include a wireless transmitter, and the communications dongle 106 may include a wireless receiver configured to receive signals from the wireless transmitter of the computer mouse 104, and transmit the signals to computing device 102 when the communications dongle 106 is interconnected with the computing device 102 and the computer mouse 104 is operational.

FIGS. 2 and 3 are bottom views of the user input device assembly 100 of FIG. 1. FIG. 2 shows the communications dongle 106 detached from the computer mouse 104, while FIG. 3 shows it attached. The computer mouse 104 may include a body 108 having an outer casing 110 having a battery compartment 112 (as shown in FIG. 4) formed in the outer casing 110. The outer casing 110 of the body 108 of the computer mouse 104 may additionally include a battery door 114 configured to be releasably secured to the outer casing 110 in an orientation that covers the battery compartment 112 of the computer mouse 104. The battery door 114 may be formed in a bottom surface 105 (as shown in FIG. 3) of the outer casing 110.

The battery door 114 may further include a mounting structure 116 configured to releasably secure the communications dongle 106 to the battery door 114, and a latch 118 for opening and closing the battery door 114.

The communications dongle 106 may include a main body 120 and a connector portion 122 configured to interconnect the communications dongle 106 to the computing device 102 to enable wireless communication between the computer mouse 104 and the computing device 102 when the communications dongle 106 is released from the computer mouse 104. The communications dongle 106 may further include a tab 124 (as shown in FIG. 3). The tab 124 may be configured to provide a gripping surface for attaching and/or detaching the communications dongle 106 to the mounting structure 116.

The mounting structure 116 may include a battery door recess 126 formed in the battery door 114, the battery door recess 126 being configured to receive at least a first portion of the communications dongle 106, such as at least a portion of main body 120 the communications dongle 106. Alternatively, the battery door recess 126 may be configured to receive an entirety of communications dongle 106.

The latch 118 may be spaced apart from the battery door recess 126 such that when the communications dongle 106 is positioned within the battery door recess 126 the latch 118 may be actuated by a user. For example, as shown in FIGS. 3 and 4, a deformable portion 118C of the latch 118 is spaced apart laterally from the battery door recess 126, and is configured to be deformed inwardly to release the battery door, even when the communications dongle 106 is secured in the battery door recess 126. When the latch 118 is deformed inwardly, detent 118D on the latch disengages from an indentation in the outer casing 110, thereby enabling the battery door 114 to be released from the outer casing 110. The latch 118 may be configured to be actuated by deformation in a direction that is perpendicular to a longitudinal axis 119 of the battery door, illustrated in FIG. 2.

The outer casing 110 of the body 108 may further include a body recess 128 formed adjacent the battery door recess 126 and sized to receive a second portion of the communications dongle 106, such as at least a portion of the connector portion 122 of the communications dongle 106. In the illustrated embodiment, the entire connector portion is contained within the recess, as viewed from above. The battery door recess 126 may be deeper than the body recess 128, to accommodate for the difference in height of the connector portion 122 and main body 120 of the communications dongle 106.

The mounting structure 116 may include one or more prongs 132 configured to create a frictional fit that releasably secures the communications dongle 106 to the battery door 114. For example and as shown in FIG. 4, the mounting structure 116 and the main body 120 of the communications dongle 106 may be configured to be releasably secured by a prong and groove connection 130. The prong and groove connection 130 may include a pair of opposed prongs 132 positioned at respective locations adjacent a lip 134 of the battery door recess 126 of the mounting structure 116. The prongs 132 may be configured to extend inwardly toward a central region of the battery door recess 126. Further, the prong and groove connection 130 may include a pair of grooves 136 formed in opposite sides of the main body 120 of the communications dongle 106, into which the prongs 132 are configured to extend when the communications dongle 106 is releasably secured to the mounting structure 116.

According to another embodiment shown in FIG. 4A, instead of or in addition to the prong and groove connection 130 described above, the mounting structure 116 may include a gripping layer 137 of an elastomeric material or other material with a high coefficient of friction, positioned on an inner surface of the battery door. The gripping layer may be configured to releasably secure the communications dongle with a friction fit when the dongle is inserted into the battery door 114. The gripping layer is illustrated as being positioned both on opposed side walls and a floor of the battery door 114. Alternatively, the gripping layer may be provided on the side walls and not the floor. It will be appreciated that the gripping layer may be manufactured according to an overmold process.

The communications dongle 106 may be releasably secured in the battery door recess 126 of the mounting structure 116 in such a way that an outer surface of the communications dongle 106 extends below the bottom surface 105 of the outer casing 110 when the communications dongle 106 is releasably secured in the battery door recess 126 of the mounting structure 116, and the battery door 114 is releasably secured to the bottom surface 105 of the outer casing 110, as illustrated in FIG. 1. Alternatively, the battery door recess 126 and/or the body recess 128 may be sized to accommodate an entirety of the height of the communications dongle 106, such that the communications dongle 106 does not extend below the bottom surface 105 when secured.

FIG. 5 is an exploded bottom perspective view of the user input device assembly 100 of FIG. 1, showing the battery door 114 detached from the computer mouse 104, revealing the battery compartment 112, and showing the communications dongle 106 detached from the battery door 114. The battery door recess 126 of the battery door may include a battery door recess floor 138. The body recess 128 may include a floor of the body recess, a body recess floor 140. A ledge 142 may be formed between the battery door recess floor 138 and the body recess floor 140 when the battery door 114 is releasably secured to the outer casing 110. The depth of the battery door recess floor 138 and the body recess floor 140 may vary. For example, the battery door recess floor 138 may be deeper than body recess floor 140. Alternatively, the battery door recess 126 may be shallower or of equal depth to the body recess 128.

Figure 6:
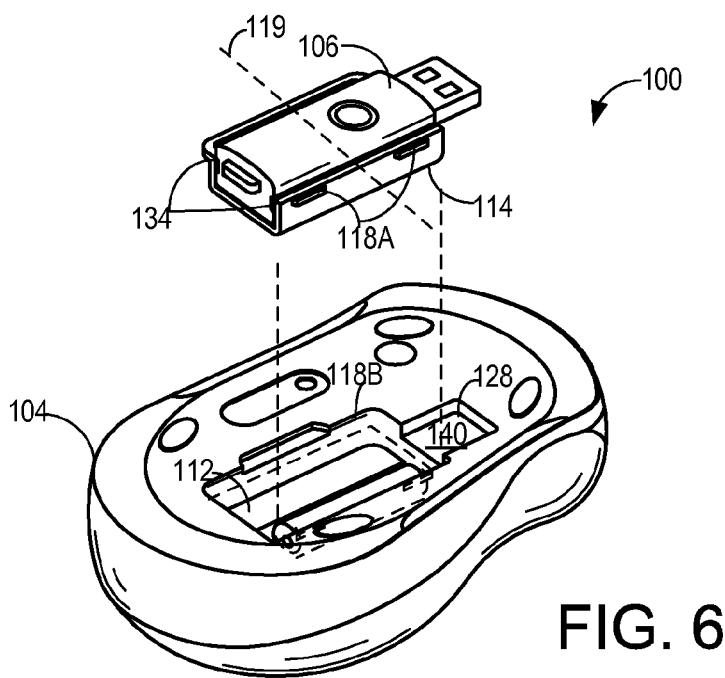
FIG. 6 is an exploded bottom perspective view of the user input device assembly of FIG. 1, showing the communications dongle releasably secured to a battery door of the computer mouse, and showing the battery door detached from the computer mouse revealing the battery compartment of the computer mouse.

FIG. 6 is also an exploded bottom perspective view of the user input device assembly 100 of FIG. 1, showing the battery door 114 attached to the communications dongle 106 and showing the battery door 114 detached from the outer casing 110 of the computer mouse 104, revealing the battery compartment 112.

The above described user input device assembly 100 provides the potential advantage of ease of storage of the communications dongle 106 within a battery door 114 of the computer mouse 104, thereby conserving valuable space on the computer mouse and potentially simplifying manufacture.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computer mouse for use with a computing device, the computer mouse comprising:
 a body including an outer casing having a battery compartment formed therein; and
 a battery door configured to be releasably secured to the outer casing in an orientation that directly covers the battery compartment,
 the battery door including a mounting structure configured to releasably secure a communications dongle configured to provide wireless communication between the computer mouse and the computing device,
 the battery door formed in a bottom surface of the outer casing,
 wherein the mounting structure includes a battery door recess formed in the battery door, the battery door recess being configured to receive at least a first portion of the communications dongle,
 the battery door further including a latch for opening and closing the battery door,
 the latch being spaced apart laterally from the battery door recess and being continuous with the battery door;

wherein the latch is configured to be deformed inwardly to release the battery door; and wherein the latch is spaced apart laterally from the battery door recess, so that the communications dongle when it is attached to the battery door does not obscure the latch so that battery door can be opened and closed with the communications dongle attached to the battery door.

2. The computer mouse of claim 1, wherein the outer casing of the body further includes a body recess formed adjacent the battery door recess and sized to receive a second portion of the communications dongle.

3. The computer mouse of claim 2, wherein a battery door recess floor of the battery door recess is deeper than a body recess floor of the body recess, and a ledge is formed between the battery door recess and the body recess when the battery door is releasably secured to the outer casing.

4. The computer mouse of claim 1, wherein the mounting structure includes one or more prongs configured to create a frictional fit that releasably secures the communications dongle to the battery door.

5. The computer mouse of claim 4, wherein the one or more prongs includes a pair of opposed prongs positioned at respective locations adjacent a lip of the recess, the prongs being configured to extend inwardly toward a central region of the battery door recess.

6. The computer mouse of claim 1, wherein the battery door is releasably secured to the bottom surface of the outer casing.

7. The computer mouse of claim 1, wherein the mounting structure includes a gripping layer of an elastomeric material positioned on an inner surface of the battery door, the gripping layer being configured to releasably secure the communications dongle with a friction fit.

8. A user input device assembly, comprising:
a computer mouse for use with a computing device,
the computer mouse including a body including an outer casing having a bottom surface, a battery compartment formed therein, and a battery door releasably secured to the outer casing in an orientation that directly covers the battery compartment,
the battery door including a mounting structure; and
a communications dongle releasably secured to the mounting structure, the communications dongle being configured to provide communication between the computer mouse and the computing device;
wherein the mounting structure includes a battery door recess formed in the battery door, the battery door recess being configured to receive at least a portion of the main body of the communications dongle;
wherein the battery door further includes a latch for opening and closing the battery door, the latch being spaced apart from the battery door recess such that when the communications dongle is positioned therein, the latch may be actuated by a user;
wherein the latch is configured to be deformed inwardly to release the battery door; and
wherein the latch is spaced apart laterally from the battery door recess, so that the communications dongle when it is attached to the battery door does not obscure the latch so that battery door can be opened and closed with the communications dongle attached to the battery door.

9. The user input device assembly of claim 8, wherein the communications dongle includes a main body and a connector portion configured to interconnect the communications dongle to the computing device to enable communication between the computer mouse and the computing device when the communications dongle is released from the computer mouse.

10. The user input device assembly of claim 9, wherein the outer casing of the body further includes a body recess formed adjacent the battery door recess and sized to receive at least a portion of the connector portion of the communications dongle, the battery door recess being deeper than the body recess.

11. The user input device assembly of claim 10, wherein the mounting structure and the main body of the communications dongle are configured to be releasably secured by a prong and groove connection.

12. The user input device assembly of claim 11, wherein the prong and groove connection includes a pair of opposed prongs positioned at respective locations adjacent a lip of the battery door recess of the mounting structure, the prongs being configured to extend inwardly toward a central region of the battery door recess, and wherein the prong and groove connection further includes a pair of grooves formed in opposite sides of the main body of the communications dongle, into which the prongs are configured to extend when the communications dongle is releasably secured to the mounting structure.

13. The user input device assembly of claim 10, wherein the battery door recess is formed in the bottom surface of the outer casing.

14. The user input device assembly of claim 13, wherein an outer surface of the communications dongle extends below the bottom surface of the outer casing when the communications dongle is releasably secured in the battery door recess of the mounting structure.

15. A computer mouse for use with a computing device, the computer mouse comprising:
a body including an outer casing having a battery compartment formed therein;
a battery door releasably secured to the outer casing in an orientation that directly covers the battery compartment, the battery door including a mounting structure configured to releasably secure a communications dongle;
wherein the mounting structure includes a battery door recess formed in the battery door, the battery door recess being configured to receive at least a first portion of the communications dongle;
wherein the outer casing of the body further includes a body recess formed adjacent the battery door recess and sized to receive a second portion of the communications dongle;
wherein a battery door recess floor of the battery door recess is deeper than a body recess floor of the of the body recess, and a ledge is formed between the battery door recess and the body recess when the battery door is releasably secured to the outer casing; and
wherein the mounting structure further includes a pair of opposed prong positioned at a location adjacent a lip of the battery door recess, the prong being configured to extend inwardly toward a central region of the battery door recess;
wherein the battery door further includes a latch for opening and closing the battery door, the latch being spaced apart from the battery door recess such that when the communications dongle is positioned therein, the latch may be actuated by a user;
wherein the latch is configured to be deformed inwardly to release the battery door; and
wherein the latch is spaced apart laterally from the battery door recess, so that the communications dongle when it is attached to the battery door does not obscure the latch so that battery door can be opened and closed with the communications dongle attached to the battery door.

* * * * *